Figure 13:
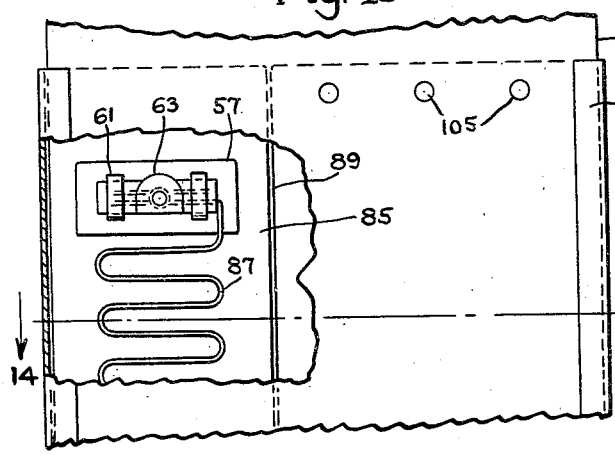

April 1, 1941.  A. J. KNEZ  2,237,151
ELECTRIC HEATER FOR WATER TANKS
Filed March 3, 1939  3 Sheets-Sheet 1
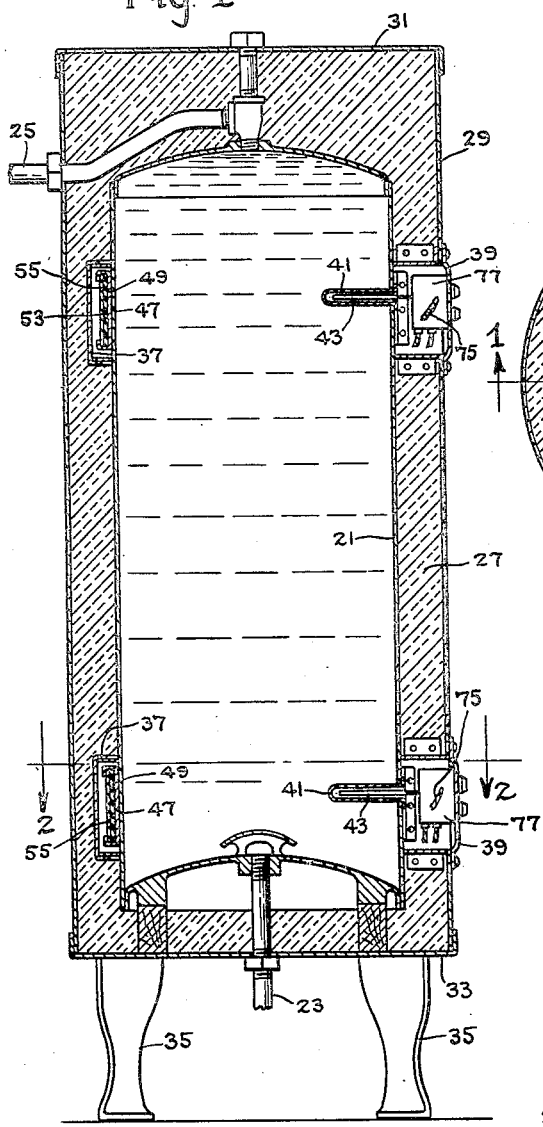
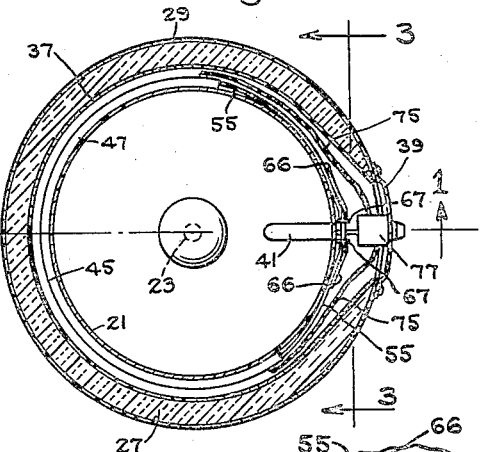
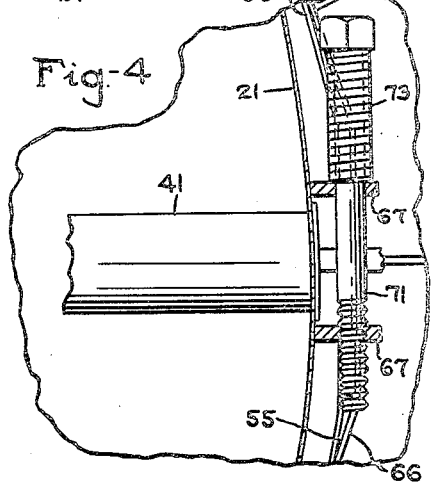
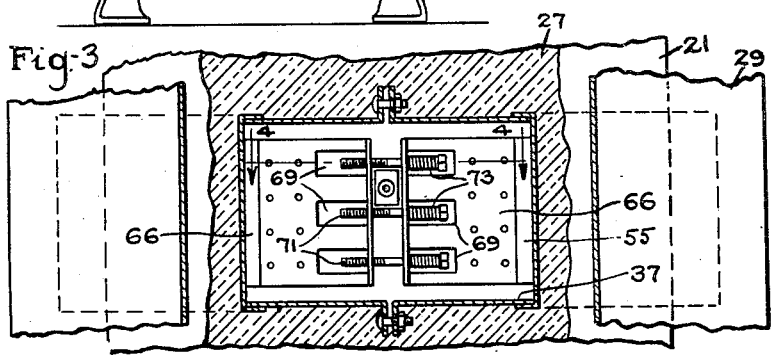
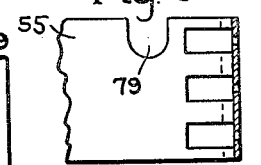
Inventor:
August J. Knez.
By HM Biebel
Attorney

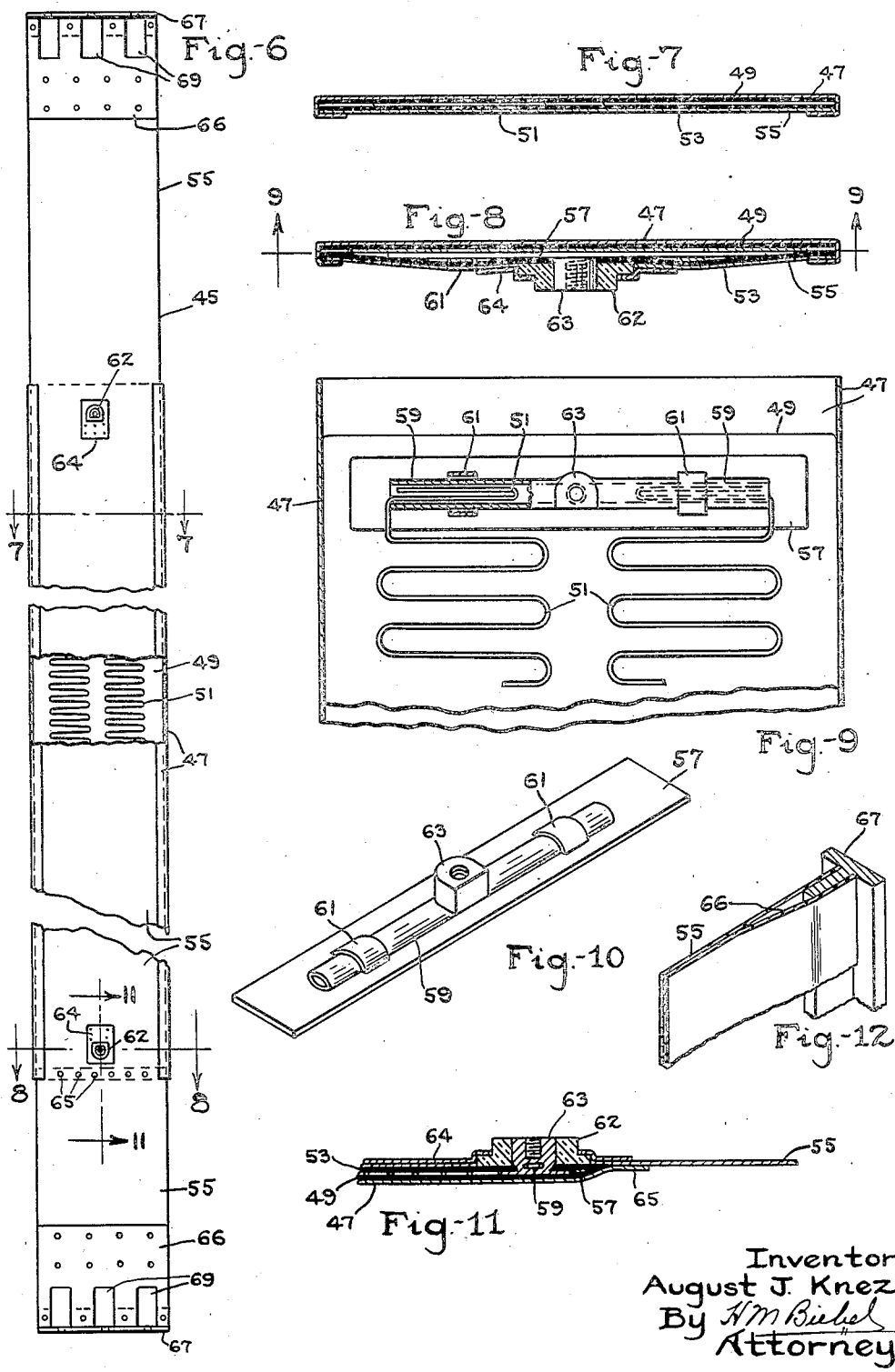

April 1, 1941.  A. J. KNEZ  2,237,151
ELECTRIC HEATER FOR WATER TANKS
Filed March 3, 1939    3 Sheets-Sheet 3

Inventor:
August J. Knez
By H. M. Biebel
Attorney.

Patented Apr. 1, 1941

2,237,151

UNITED STATES PATENT OFFICE 2,237,151

ELECTRIC HEATER FOR WATER TANKS

August J. Knez, Chicago, Ill., assignor to McGraw Electric Company, Elgin, Ill., a corporation of Delaware Application March 3, 1939, Serial No. 259,511

3 Claims. (Cl. 219—38)

My invention relates to electric heating elements and particularly to heating elements for use on hot water tanks.

An object of my invention is to provide a relatively simple metal encased electric heating unit particularly applicable for mounting around water tanks.

Another object of my invention is to provide a totally metal-encased semi-flexible electric heating element of relatively small thickness which can be easily and quickly attached to and removed from proper operative position on a hot water tank.

Another object of my invention is to provide a relatively thin electric heating element adapted to be clamped around a water tank and embodying means to maintain substantially uniform clamping pressure during operation thereof.

Another object of my invention is to provide a tank heating element in which the distance between the heating resistor and the tank surface is relatively small and the area of the heat-conducting contact surface therebetween is relatively large.

Another object of my invention is to provide a clamp-on electric heating element that can be mounted on any one of a number of tanks with but slight changes in the clamping means.

Another object of my invention is to provide an encased electric heating element of generally band-like shape, in which the lateral extent of the resistor is appreciably less than that of the casing structure.

Still another object of my invention is to provide an electric heating element for use on a hot water tank that shall be so constructed and clamped thereon as to tightly engage the outer surface thereof with substantially uniform contact pressure therebetween over the entire engaging surface.

Yet another object of my invention is to provide a construction for a hot water tank heater which will reduce heat loss in an outwardly direction to a relatively small amount.

Other objects of my invention will either be pointed out hereinafter in the course of a description of several forms of heating elements now preferred by me or will be evident from such description.

While I have illustrated several forms of an electric heating element embodying my invention, I desire it to be understood that I do not wish to be limited to the precise details of construction illustrated in the drawings and described in the specification but that all obvious modifications of the devices illustrated, coming within the scope of the appended claims, are to be considered a part of my invention.

Figure 14:
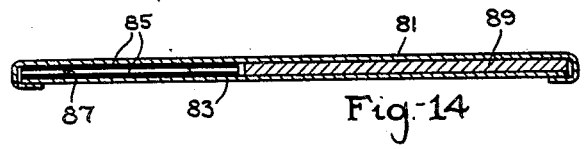
Figure 15:
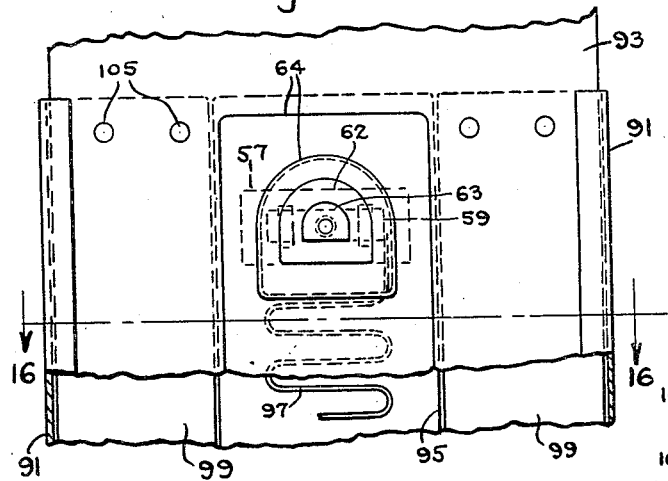
Figure 16:
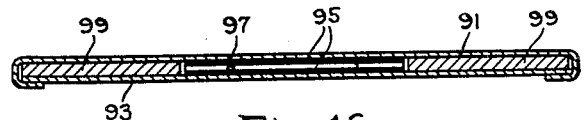
Figure 17:
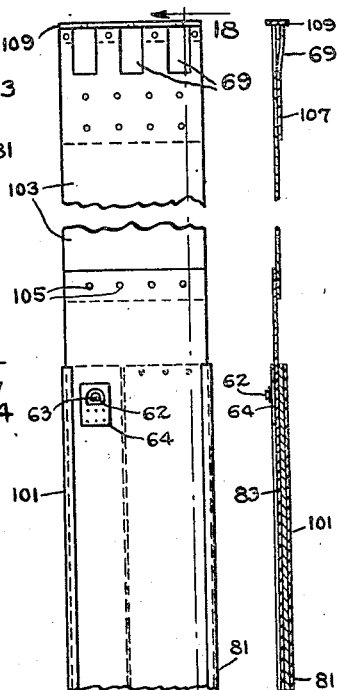
Figure 18:
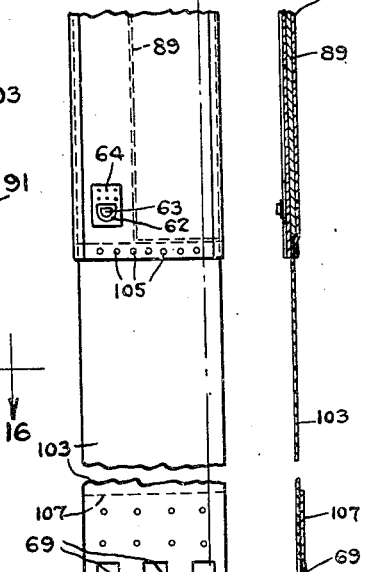

In the drawings,

Figure 1 is a central vertical sectional view through a hot water tank having my improved electric heating element mounted thereon, this view being taken on the line 1—1 of Fig. 2, Fig. 2 is a horizontal sectional view taken on the line 2—2 of Fig. 1, Fig. 3 is a fragmentary enlarged vertical sectional view, taken on the line 3—3 of Fig. 2, showing, in front elevation, the means for retaining a heater on the tank, Fig. 4 is a fragmentary enlarged sectional view of a water tank and a heater clamping bolt, taken on the line 4—4 of Fig. 3, Fig. 5 is a fragmentary detail of a part of the heater structure showing a portion cut out for receiving a thermostat, Fig. 6 is a detail plan view of an electric heater embodying my invention, before bending, Fig. 7 is a cross-sectional view therethrough, on an enlarged scale, taken on the line 7—7 of Fig. 6, Fig. 8 is a view similar to that of Fig. 7, but taken on the line 8—8 of Fig. 6, Fig. 9 is a fragmentary enlarged sectional view, taken on the line 9—9 of Fig. 8, Fig. 10 is a detail perspective view of a terminal member, Fig. 11 is a fragmentary sectional view, on an enlarged scale, showing the welded contact between the gib and the casing strip, this view being taken on the line 11—11 of Fig. 6, Fig. 12 is a fragmentary perspective view showing a clamping extension secured to a relatively heavy member of T-shape, Fig. 13 is a fragmentary enlarged plan view, partly in section, showing a single heating element located at one side of the casing assembly, Fig. 14 is a sectional view therethrough, taken on the line 14—14 of Fig. 13, Figs. 15 and 16 are views similar to Figs. 13 and 14 but showing the single heating element in the middle of the casing assembly, Fig. 17 is a plan view, on a reduced scale, of the detail shown in Fig. 13, but in complete assembly, and Fig. 18 is a longitudinal sectional view therethrough, taken on the line 18—18 of Fig. 17.

Referring first to Figs. 1 and 2 of the drawings, I have there illustrated a hot water tank 21 of the usual kind, provided at its bottom end with a cold water inlet pipe 23 having a baffle thereon and with a hot water outlet pipe 25 at its upper end. The tank 21 is surrounded by a layer 27 of a suitable heat insulating material of the kind now commonly used for such purposes and I may provide also an outer casing 29 of thin sheet metal to properly protect the heat insulating covering 27. An outer cover 31 and a bottom plate 33 may cooperate with the outer casing 29 to entirely enclose the heat insulating material. A plurality of supports 35 may be provided in a manner now well known in the art.

The electric heating element embodying my invention and to be hereinafter described in detail is adapted to be clamped tightly against the outer surface of the tank and I may use one or more of such clamped-on heating elements and I have elected to show a hot water tank structure having an upper and a lower heating element associated therewith.

I provide two tunnel structures 37 for the respective heating elements and these may be made of relatively thin sheet material, of generally channel shape in lateral section, the inner side of the tunnel being open toward the tank itself. The details of construction of this tunnel are already old in the art and for further information in regard to such structure reference may be had to Scharf Pat. No. 2,101,691, assigned to the same assignee as is the present application. The tunnel structure has an opening in its outer wall at one part of its periphery and is preferably provided with a removable cover 39 to permit of access to the tunnel for purposes to be hereinafter set forth.

It may be desirable to individually thermally control the respective water heaters and for this purpose I may provide the tank 21 with inwardly extending tubes 41 adjacent the top and the bottom heaters, secured to the tank in a water-tight manner, each tube having located therein a conventional form of thermal control member 43. The details of the inwardly extending tube and of the thermal control element therein as well as the details of the control system for the individual or for the plurality of heating elements constitute no part of my invention.

Referring now to Fig. 6 of the drawings, I have there illustrated an assembled metal encased heating element before the same has been bent to arcuate shape to adapt it for clamping engagement around a circular hot water tank. The electric heating element 45 includes an initially flat metal casing strip 47 which is preferably relatively thin and at least semi-flexible. Against one surface of this metal casing strip I locate a relatively thin strip 49 of electric-insulating material, such as mica, the width of which may be slightly less than the initial width of the strip 47. An electric heating resistor 51 may be of the form shown in Fig. 9 of the drawings from which it will be noted that the resistor comprises a plurality of substantially parallel-spaced straight convolutions conected at adjacent ends by rounded end portions all of the parts of a resistor lying initially in the same plane. While I have shown two such resistor elements extending parallel to each other and along the heating element I do not desire to be limited to this number but may use any desired number of such heating resistors.

An outer strip 53 of thin electric-insulating material, such as mica, is located against the outer surface of inner strip 49 and of the resistor. A thin sheet metal gib 55 whose width is somewhat less than that of the metal casing strip 47 is positioned against the outer surface of the outer layer of mica strip 53 and the side edges of the casing strip 47 are bent around and over the side edges of the gib 55 and in the course of such bending are compresed tightly thereagainst. This construction provides a substantially entirely metal encased mica-insulated heating unit.

A terminal structure for each of the two ends of a heating element includes a thin flat metal plate 57 extending laterally of the heating unit, as is shown more particularly in Fig. 9 of the drawings. A metal tube 59 is associated with the plate 57 and in order to provide for relatively large engaging surface therebetween I may bend out one or more bridge portions 61 from the plate 57 and preferably flatten the tube 59 to permit of forcing it under one or a plurality of such bridges 61. I preferably return-bend the ends of the individual resistor wires 51 substantially as shown in Fig. 9 of the drawings and insert these return-bent ends in the flattened tube 59 after which I may subject the plate 57 and the tube 59 to further pressure to obtain a relatively large current carrying area between the wire 51 and the tube 59 and at the same time reduce the thickness of the terminal structure. In order to prevent relative motion between the tube 59 and the plate 57 I may weld the two together although this is not essential. A terminal 63 having a screw threaded opening therein may be welded to the tube 59 to permit of connecting supply circuit conductors to the respective ends of the resistor for the purpose of energizing the heating element. This terminal is preferably of non-circular shape in cross section and has an electric-insulating bushing 62 loosely associated therewith. A locking bar 64, of thin sheet metal, may have one end spot welded to the gib 55 and surround the bushing 62 to hold the same in place, as shown in Figs. 6 and 11.

All of the work of assembly hereinbefore described is done before the heating unit itself is bent to substantially arcuate shape to adapt it for clamping against a hot water tank. It is obvious of course that even though the thickness of a heating unit of this kind is very small, on the order of one-eighth inch, there is an appreciable difference between the length of the casing strip 47 and of the gib 55 for the same peripheral extent. It is desired to minimize the relative movement which may occur between the inner and the outer mica strips during bending and further to prevent relative longitudinal movement of the parts of the heating unit during operation thereof when the temperature may vary from room temperature to several hundred degrees Fahrenheit. In order to minimize such relative longitudinal movements I prefer to spot weld two adjacent points or portions of the casing strip 47 and of the gib 55 to each other, a construction which has been shown more particularly in Figs. 6 and 11 where the welds are indicated by numeral 65. In one embodiment of my invention, the gib 55 itself may have a length sufficient to substantially completely encircle a tank or the respective end portions of the gib 55 may have an extra strip 66 secured thereto, structural members 67 of T-shape, being spot welded between the outer ends of these strips, as shown more particularly in Figs. 3 and 4. A plurality of apertures 69 are provided in the respective T-shaped members 67 through which clamping bolts 71 are adapted to extend. In Fig. 3 I have illustrated the use of three such clamping bolts spaced from each other, the outer clamping bolts being positioned relatively near to the outer edge of the heating unit in order that the clamping pressure created by the bolts may be made substantially uniform over the entire width of the clamped-on heating unit.

I provide a relatively heavy coil type compression spring 73 on each of the bolts, and I may initially draw up the individual bolts 71 to such an extent that the spring 73 associated therewith will be fully compressed. However, while I have shown such fully compressed clamping springs, I do not desire to be limited thereto. I do however desire to use relatively heavy springs of coil or of any other suitable shape, so that a relatively large clamping pressure may be exerted to reduce the actual clearance between the inner surface of the casing strip 47 and the outer surface of tank 21 to as small a value as may be possible and thereby reduce the thermal reluctance between the engaging surfaces of the metal casing strip of the heater and of the water tank, as well as to maintain a substantially uniform pressure therebetween under all operating conditions.

It is obvious that since the temperature of the heating unit is higher than that of the tank, and of the tank contents, when the heating unit is at its operating temperature it will have expanded to a slightly greater peripheral length than when it was installed and mounted in a cold condition, which is usually at room temperature. The provision of a compression spring associated with the respective clamping bolts permits of a take-up effect of the clamping means with increased temperature, whereby I am able to maintain the clamping pressure between the heating unit and the tank at a substantially constant or uniform amount. In other words, the reduction of clamping pressure between the heating element and the tank surface is a relatively small amount only, thereby maintaining a relatively highly efficient heat path between the resistor proper and the tank.

I may here point out that I may make the thickness of the casing strip 47 relatively small and that I may use relatively thin sheets 49 and 53 of electric-insulating material to thereby reduce the length of heat-flow path from the resistor proper to the tank which is to be heated thereby. This also has the effect of reducing the thermal capacity of the assembled heating element.

I wish to point out further also that I use substantially incompressible media between the clamping gib and the tank and that the radial thickness of the heating unit has been reduced to a very small amount. It is also obvious that the use of an outer clamping gib, such as is disclosed in my invention results in tightly holding the terminal members in their proper operative positions in the assembled heating unit.

It may be well to here point out that certain of the views exaggerate, even in proportion, the thickness of the heating unit as actually made in practice, which units have been thus far made with a radial thickness on the order of about one-eighth inch.

In order to install one of these heating units in its proper operative position in a tunnel 37 the cover 39 of the tunnel may be removed and since the heating unit is semi-flexible I find it possible to insert a heating unit into and move it through the tunnel in which it is to be located, until the two ends of the gib 55 are positioned adjacent to or in substantial register with the opening covered by plate 39. It is then possible to insert the bolts 71 with a spring 73 thereon and to then tighten them up as hereinbefore described.

It is to be understood that terminal leads 75 are connected to the respective terminals 63 and that these terminal leads may extend to a suitable control box 77 supported in any desired manner within the opening in the tunnel covered by plate 39.

In case it becomes necessary to replace a heating unit, the cover 39 and the control box 77 may be removed, after which the bolts 71 may be loosened and then removed. I have found it easily possible to cause peripheral movement of the heating unit with one end of the gib 55 led out through the opening of the tunnel, the flexibility of the unit being sufficient to permit of relatively easy and quick removal of the heating unit by a peripheral movement thereof relatively to the tank. The same comments apply with regard to the insertion of a new or repaired heating unit.

I wish to here point out that I have found it possible to greatly reduce the radial thickness of the heat insulating material 27 positioned around the tank and at the same time to reduce the outside temperature on that part of the casing 29 positioned radially outside of one of the heating elements, thereby indicating that an electric heating unit of the kind embodied in my invention provides a high-efficiency thermal heat-flow path to the outer surface of the tank, the loss of heat radially outwardly from the heating unit, in any manner, being greatly reduced.

Referring particularly to Fig. 5 of the drawings, I have there illustrated a gib 55 which, because it is made relatively wide, must be provided with a recess 79 at one edge thereof so that it may clear the thermostat 49.

Referring now to Figs. 13 to 16 inclusive I have there shown several modifications of the heating unit and element shown in Figs. 1 to 12 inclusive. Referring for instance to Figs. 13 and 14, I have there illustrated a thin metal casing 81 cooperating with a gib 83 to substantially entirely enclose a heating element consisting of two strips 85 of electric insulating material such as mica, having a heating resistor 87 located therebetween which resistor may comprise a plurality of parallel-extending spaced convolutions connected by integral end portions, it being noted that the resistor is not to be wound around a sheet of mica but is formed to the shape shown in Fig. 13 and is then located between the two mica sheets 85. The casing strip 81 has its side portions bent over and around the gib 83 in substantially the same manner as has heretofore been set forth in connection with the heating element shown in Figs. 6 and 7.

In this case however the heating resistor does not extend over substantially the entire width of the casing but extends over only a portion thereof. The rest of the lateral space within the casing is taken up by a spacing strip 89, preferably of heat conducting metal, the thickness of which is substantially that of the resistor 87 and the two mica sheets 85.

The terminal construction may be substantially the same as that hereinbefore described for the heating unit shown in Fig. 6, and as shown in Fig. 10.

Referring now to Figs. 15 and 16, I have there illustrated a slightly different form of heating element including a thin sheet metal casing 91 and a gib 92 having a heating element incased therein which element includes two relatively thin sheets 95 of electric insulating material such as mica and a heating resistor 97 located therebetween. The shape of this resistor 97 is substantially the same as has already been hereinbefore described. In this modification I locate the insulated heating element substantially along the middle of the width of the heating unit and provide a pair of filler or spacer strips 99, one at each side of the heating unit. In all other respects this heating unit is substantially the same as has already been described in connection with Figs. 13 and 14.

I may point out that I have found it possible to greatly reduce the lateral width of the heating element, making it only a fraction of the width of the casing, without increasing the watts per square inch provided by the heating unit to be an unduly large amount. The provision of either one filler strip 89 or of two filler strips 99 (which, as noted above, may be made of heat-conducting material) makes it possible to return a relatively large proportion of the heat which might otherwise be radiated away from the outside surface of the heating element to the tank and I find it possible to distribute the heat generated by the resistors 87 or 97 over substantially the entire width of the heating unit.

Figs. 17 and 18 show another element of my invention which may briefly be described as follows: A heating element 101 of the type shown either in Fig. 9, 13 or 15 that is consisting only of a casing, a gib of substantially the same length as the casing and the insulated heating resistor enclosed thereby has a constant length. Means are provided whereby I am able to adapt a heating element of constant length for use on tanks of different outer peripheral dimensions.

This is accomplished by using at least one extension 103 of thin sheet metal which may be spot welded as shown at 105 to one end of the gib hereinbefore described. I have illustrated in Figs. 17 and 18 the use of two extensions 103 and the main reason for using two such extensions is that I obtain a more flexible heater unit construction. As has already been described for the construction shown in Figs. 1 to 12, I use an auxiliary metal strip 107 associated with each of the extensions 103, and a terminal member 109 of structural shape (here shown as of T-shape) through which terminal members the clamping bolts 71 are adapted to extend.

I have found that a heating unit of the kind shown in Figs. 13, 14, 17 and 18 provides a highly efficient construction using relatively thin strips of sheet metal which give the desired flexibility while at the same time the auxiliary end portions 107 provide sufficient strength so that I am enabled to use relatively heavy clamping bolts 71 and relatively heavy springs 73 whereby I find it possible to maintain a relatively low external temperature of the encased heating unit irrespective of the slight increase in length of the heating unit because of rise of temperature in operation.

I may point out that I have made tests of such a clamp on a heater without using the equalizing springs 73 and find that after some time of operation, the temperature of the heater itself is several hundred degrees higher than is the case when the springs 73 are used.

I claim as my invention:

1. A metal encased band-like electric heating unit comprising a metal casing, an insulated heating element in said casing of appreciably lesser width than said casing and at least one filler strip of substantially the same thickness as is the insulated heating element at one side of said insulated heating element.

2. A metal encased band-like electric heating unit comprising a metal casing, an insulated heating element in said casing of appreciably lesser width than said casing and at least one heat conducting filler strip of substantially the same thickness as is the insulated heating element at one side of said insulated heating element.

3. A metal encased band-like electric heating unit comprising a metal casing, an insulated electric heating element in said casing at one side thereof and having a width which is a fraction only of the width of the casing and a heat conducting filler strip of substantially the same thickness as that of the insulated heating element adjacent the other side of the casing and to the heating element.

AUGUST J. KNEZ.